United States Patent Office 3,781,313
Patented Dec. 25, 1973

3,781,313
SULFONE INTERMEDIATES FOR THE
SYNTHESIS OF VITAMIN A
Marc Julia, Paris, France, assignor to
Rhone-Poulenc S.A., Paris, France
Claims priority, application France, Jan. 20, 1971,
7101792
Int. Cl. C07c 143/90
U.S. Cl. 260—402    8 Claims

ABSTRACT OF THE DISCLOSURE

Vitamin A acid and its esters, which are known intermediates for the production of vitamin A, are made by the action of alkali on sulphones of the formula:

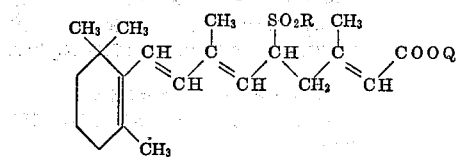

where R is an aryl radical and Q is hydrogen or an organic radical, themselves made by reaction of γ-halogenosenecioates on sulphones of formula:

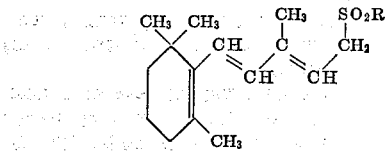

which in turn are made by the action of an aryl sulphinate on vinyl-β-ionol.

---

The present invention relates to sulphones, their preparation, and their use in the synthesis of vitamin A.

The present invention provides, as new compounds, the sulphones of the formula:

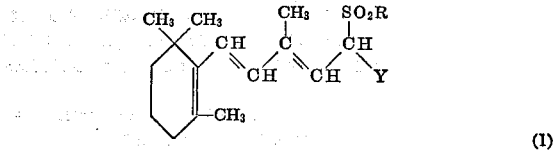

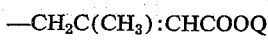

(I)

in which R is an aryl radical and Y is hydrogen or

—CH$_2$C(CH$_3$):CHCOOQ where Q is hydrogen or a hydrocarbon radical.

It is to be understood that the formulae used herein do not necessarily represent sterically pure products but can represent mixtures of cis and trans isomers.

The sulphones of Formula I in which Y is

—CH$_2$C(CH$_3$):CHCOOQ i.e. those of formula:

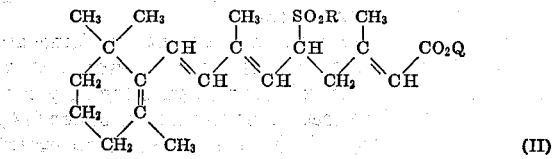

(II)

in which R and Q are as hereinbefore defined, may be converted into vitamin A acid or an ester thereof as hereinafter described.

R is preferably a naphthyl, phenyl or alkylphenyl-, such as p-toluyl, radical. Q, when it represents a hydrocarbon radical, can be an alkyl, cycloalkyl, aryl or aralkyl radical; preferably, it represents an alkyl radical of 1 to 4 carbon atoms, such as methyl or ethyl.

The sulphones of Formula II are obtained by reaction of a sulphone of Formula I in which Y is hydrogen, i.e. a sulphone of formula:

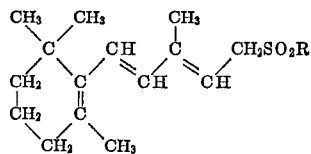

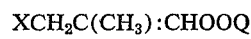

(III)

with a γ-halogenosenecioate of formula:

XCH$_2$C(CH$_3$):CHOOQ    (IV)

in which X is chlorine, bromine or iodine.

The reaction of the halide of Formula IV with the sulphone of Formula III is preferably carried out at below 0° C., for example at between —65° and —25° C. or even lower, using substantially equimolecular amounts of the compounds of Formulae III and IV. It is advantageous to effect the process in the presence of solvents chosen with regard to the temperature used; these can be ethers such as diethyl ether, tetrahydrofuran or dioxan, hydrocarbons such as benzene, toluene, or xylenes, or polar aprotic solvents such as dimethylformamide, dimethylacetamide, dimethylsulphoxide, hexamethylphosphorylamide, or N-methylpyrrolidone. The process is effected in the presence of a mineral or organic basic reagent having sufficient reactivity to convert the methylene group carrying the —O$_2$SR radical of the sulphone III into an anion. Suitable bases are, e.g. alkali metal alkoxides, alkali metal hydrides, alkali metal amides, and organometallic compounds such as organo-lithium, -zinc, and -magnesium compounds. About 1 mole of basic reagent per mole of sulphone is used. Generally, a solution of the halide of Formula IV is slowly added to the mixture of the other constituents of the reaction mass. After the reaction and the usual working-up treatments, the sulphone of Formula II is isolated, for example by chromatography.

The γ-halogeneosenecioates of Formula IV can be obtained by halogenation of the corresponding senecioate with N-halogenosuccinimide, for example by bromination with N-bromosuccinimide.

The sulphones of Formula III can be obtained by reaction of an alkali metal of sulphinate of formula RSO$_2$M, in which M represents an alkali metal, either with a halide of formula

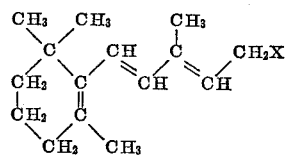

in which X represents chlorine, bromine or iodine, obtained by halogenation of vinyl-β-ionol with a phosphorus trihalide or with vinyl-β-ionol itself. In the latter case, the reaction is preferably carried out in the presence of an acid such as acetic acid, and proceeds readily at about 20° C.

The sulphones of Formula II can easily be converted into vitamin A acid, of formula:

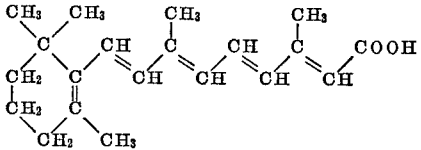

or into an ester thereof, by treatment with an alkaline reagent. A mixture of the sulphone of Formula II and the alkaline reagent may be reacted at a temperature between 0° and 100° C. It is advantageous to render the reaction mixture homogeneous by addition of a solvent such as an alcohol of low molecular weight, e.g. ethanol or methanol. The alkaline reagent is preferably an alkali metal hydroxide such as potassium hydroxide or sodium hydroxide. At the end of the reaction, the crude acid or ester is isolated by the usual working-up treatments, and may then be purified by recrystallization to yield the sterically pure vitamin A acid or ester.

The following examples illustrate the invention.

EXAMPLE I

Potassium t-butylate (224 mg., 0.002 mol) is introduced, under nitrogen, into a 10 ml. capacity flask equipped with a rubber cap. A solution of the sulphone of formula

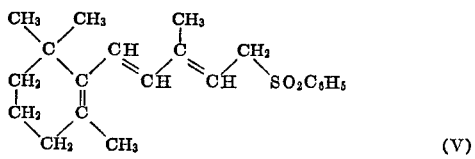

(V)

(688 mg.) in anhydrous tetrahydrofuran (2 ml.) is added by a syringe. The solution darkens to blood red on contact with the potassium t-butylate, which dissolves entirely in the reaction mixture. The mixture is then cooled to —30° C. with stirring (using a magnetic stirrer).

Ethyl γ-bromosenecioate (414 mg., 0.002 mol) is then introduced by the syringe. When the addition is complete, the whole is allowed to return to about 20° C. with stirring throughout. The color of the reaction mixture becomes progressively lighter. It is stirred for a further 2 hours and then left to stand for 15 hours. After this time, a copious precipitate is present, covered by a light orange solution.

The mixture is treated with water and extracted with diethylether. After the usual treatments of the ether layer (washing with water, drying over magnesium sulphate and evaporation of the ether) an orange oil (832 mg.) is obtained, which is analyzed by thin layer chromatography (on silica using methylene chloride/cyclohexane/ethyl acetate in the ratio of 45/50/5 by volume), and found to contain:

45% of the sulphone-ester of formula:

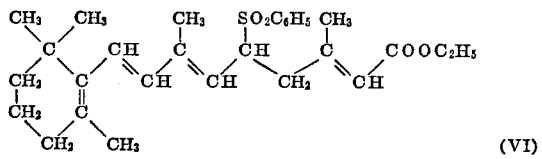

(VI)

13% of the starting sulphone of Formula V, and 42% of other, unidentified products.

The yield of the sulphone-ester of Formula VI is thus 40% based on the starting sulphone of Formula V.

The pure sulphone-ester of Formula VI (375 mg.) is isolated by purification on a thin layer chromatography plate. Recrystallization from methanol yields pale yellow crystals (218 mg.) melting at 106–107° C. (capillary tube) and giving a single spot on thin layer chromatography (on silica using methylene chloride/cyclohexane/ethyl acetate in the ratio of 45/50/5 by volume).

The initial starting materials were prepared as follows:

(a) The ethyl γ-bromosenecioate (mixture of cis and trans isomers) was prepared by bromination of ethyl senecioate with N-bromosuccinimide in a yield of 67% based on the N-bromosuccnimide, following the method described by Ahmad et al., J. Chem. Soc., 1958, C. 185 to 187.

(b) The starting sulphone of Formula V is obtained by reaction of sodium phenylsulphinate with the bromide of formula

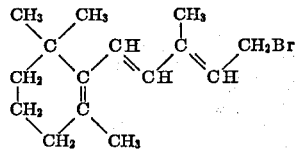

Sodium phenylsulphinate (1.64 g., 0.01 mol) and anhydrous methanol (10 ml.) are introduced into a three-necked flask equipped with a mechanical stirrer and a thermometer and kept under a nitrogen atmosphere. To this solution, cooled to about 10° C., is added a solution, in diethylether, of the bromide (obtained by the bromination of 0.01 mol of vinyl-β-ionol, and corresponds to 60% of the theoretical amount). At the end of the addition, a white precipitate is observed, covered by a yellow solution. The mixture is stirred for a further hour at about 20° C., diluted with water and extracted with diethylether. The usual treatment of the ether layer (washing with water, drying over magnesium sulphate and evaporating the ether) yields an orange oil (2.84 g.).

Thin layer preparative chromatography of the crude product (217 mg.) (on silica using methylene chloride/cyclohexane/ethyl acetate in the ratio of 45/50/5 by volume) allows the sulphone of Formula V (102 mg., 47% of the crude mixture) to be isolated. The yield of the sulphone of Formula V based on the starting bromide is 62% (or 37% based on the initial vinyl-β-ionol). This sulphone is a mixture of two isomers.

(c) The bromide starting material was obtained by bromination of vinyl-β-ionol with phosphorus tribromide. Anhydrous diethyl ether (2.5 cc.), pyridine (0.05 cc.) and vinyl-β-ionol (2.2 g., 0.01 mol) of formula:

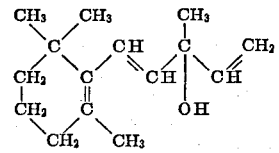

are introduced into a flask equipped with a stirrer. The whole is cooled to —35° C. with stirring, and a mixture of anhydrous diethyl ether (1 cc.) and phosphorous tribromide (0.9 g.) is added dropwise. When the addition is complete, stirring is continued for a further 30 minutes at —35° C., and the temperature is then allowed to rise to 0° C. and kept thereat for one hour, with stirring. The ether phase is separated, the residue is washed with diethyl ether, and the ether layers are combined and washed with an ice-cold solution of sodium bicarbonate. The aqueous layer is extracted with diethylether, and the ether layer is rapidly washed with ice-cold water. The combined ether layers are then dried over magnesium sulphate. After evaporation of the ether at 0° C., a crude bromide (2.17 g.) is obtained, containing 80% of the desired bromide; the yield of the bromide is thus 60% based on the vinyl-β-ionol. This bromide is not stable in the pure state and at ambient temperature; it is preferably stored as a solution in diethylether, under nitrogen, and at a temperature below 0° C.

EXAMPLE II

This example illustrates the use of the sulphoneester of Formula VI for the preparation of vitamin A acid, which can itself be converted in a known manner into vitamin A by reduction of the —CO₂H group to the hydroxymethyl group —CH₂OH.

The pure, but un-recrystallized sulphone-ester of Formula VI (106 mg.), potassium hydroxide (38 mg.) and ethanol (95% by volume, 0.315 ml.) are introduced into a tube. On heating, the mixture becomes homogeneous to give an orange solution. It is heated under reflux of the ethanol for 2 hours. After taking up in water, acidifying with a few drops of 2 N sulphuric acid and extracting with diethylether, working up of the ether phase yields pale yellow crystals (70 mg.) in which $C_6H_5SO_2$ radicals can no longer be detected and which contain 80% of vitamin A acid. Recrystallization from methanol yields yellow crystals (42 mg.) melting at 176–179° C. (literature melting point=179°–180° C.; the structure was also checked by infra-red spectrum and nuclear magnetic resonance).

EXAMPLE III

This example illustrates the preparation of the sulphone of Formula V by reaction of sodium phenylsulphinate with vinyl-β-ionol.

Sodium phenylsulphinate (5.33 g. g., 30% molar excess based on the vinyl-β-ionol) is dissolved in acetic acid (150 ml.), previously distilled over potassium permanganate, in an Erlenmeyer flask of 500 ml. capacity. Vinyl-β-ionol (5.5 g., 0.025 mol) is added to this limpid, colorless solution and the reaction mixture is stirred for a few moments to homogenize it. No evolution of heat occurs; the mixture is left to stand at about 20° C. for 15 hours. It is then treated with water (300 ml.) and extracted with diethyl ether. The ether phase is separated, washed with water, then with an aqueous saturated sodium bicarbonate solution until it gives a neutral reaction, and then again with water. The ether phase is dried over magnesium sulphate and the ether is driven off. An oily residue (8.43 g.) is thus obtained which no longer shows traces of hydroxyl groups on infra-red analysis, and of which the IR spectrum is very similar to that of the pure sulphone of Formula V.

Starting with this crude sulphone (208 mg.), thin layer chromatography (on a silica support using methylene chloride/ethyl acetate/cyclohexane, in the ratio of 45/5/50 by volume for elution) detects 87% of the pure sulphone of Formula V in the sterically pure form (a single spot in thin layer chromatography). The calculated yield of the desired sulphone is thus 85% based on the crude vinyl-β-ionol introduced. The latter was found by vapor phase chromatography to have a purity of about 85%. The reaction is hence practically quantiative with respect to the pure vinyl-β-ionol.

EXAMPLE IV

A solution of 1.03 g. of the sulphone of Formula V described in Example 1 (82% pure, 0.0025 mol), in 3 cm.$^3$ of tetrahydrofuran is run into a suspension of 296 mg. of potassium t-butylate (0.0026 mol) in 6 cm.$^3$ of tetrahydrofuran, maintained at a temperature of —60° to —65° C. A solution of 540 mg. of methyl γ-bromosenecioate (0.0028 mol) in 3 cm.$^3$ of tetrahydrofuran is added. After the addition is complete, hydrolysis is carried out with a 50/50 mixture of water and tetrahydrofuran. The temperature is allowed to rise to 25° C., and the mixture is then extracted with diethyl ether. The extracts are dried over magnesium sulphate and the solvents are evaporated. 1.39 g. of an oil are thus obtained, the constituents of which are determined by preparative chromatography (on silica using methylene chloride/cyclohexane/ethyl acetate in a volume ratio of 45/50/5). According to this determination, 72% of the starting sulphone were converted into the desired product of Formula II and 11.5% were recovered unchanged. The yield of desired product is thus 81%. The methyl sulphone-carboxylate of the Formula II, M.P. 113–114° C., is isolated by recrystallization from methanol.

EXAMPLE V

As in Example IV, 1.03 g. of the same sulphone, of 82% purity, are reacted with 592 mg. of potassium t-butylate and 1.08 g. of methyl γ-bromosenecioate, both dissolved in tetrahydrofuran. The reaction mixture is then worked up by the same process and 1.720 g. of an oily product are obtained, found to contain 89.5% of the desired methyl sulphone-carboxylate. This determination also shows that the starting sulphone has completely disappeared.

EXAMPLE VI 1 g. of the methyl sulphone-carboxylate prepared as in Example V is added, with stirring, to a solution of 120 mg. of metallic sodium $(2.2 \times 10^{-3})$ mol) in 5 cm.$^3$ of anhydrous methanol. After about 15 hours, the product is hydrolyzed and the mixture extracted with diethylether. After evaporation of the solvent, 685 mg. of an oily product are obtained, from which a fraction consisting of the methyl ester of vitamin A-acid, and representing 75.5% by weight of the crude oil, is isolated by preparative thin layer chromatography (on silica using methylene chloride/cyclohexane/ethyl acetate in a volume ratio of 45/50/5).A sulphone-ester fraction representing 7% of unconverted starting material is also isolated. The yield based on converted starting material is thus 82%. The vitamin A acid ester is recrystallized from isopropanol, and then melts at 48°–50° C.

EXAMPLE VII 560 cm.$^3$ of acetic acid, 85.28 g. of sodium phenylsulphinate and 88 g. of vinyl-β-ionol are introduced into a 1 litre three-neck flask equipped with a condenser, a stirrer system and an inlet for inert gas. The mixture is left stirring at ambient temperature for 72 hours and the acetic acid is then removed in a vacuum produced by a vane pump ($10^{-1}$ mm.). The reaction mixture is then taken up in 4 l. of water and extracted with 4 times 500 cm.$^3$ of diethyl ether. The combined ether layers are washed with water, neutralized with sodium carbonate and then dried over sodium sulphate. The ether is driven off and 127 g. of a viscous mass are thus obtained, found by nuclear magnetic resonance to contain 90% of the desired sulphone. Recrystallization from an equal weight of di-isopropyl ether yields 84 g. (61%) of a white product, M.P. 56° C., which is the sulphone of Formula V of Example I.

I claim:

1. A sulphone of the formula:

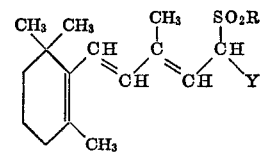

in which R is an aryl radical and Y is hydrogen or —CH$_2$C(CH$_3$):CHCOOQ, where Q is hydrogen or an alkyl, cycloalkyl, aryl, or aralkyl radical.

2. The sulphone as claimed in claim 1 of formula:

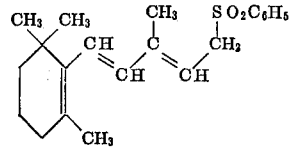

3. The sulphone as claimed in claim 1 of formula:

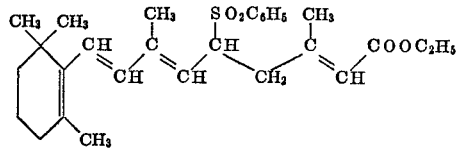

4. The sulphone as claimed in claim 1 of formula:

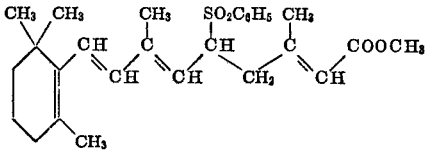

5. Process for the preparation of a sulphone of the formula:

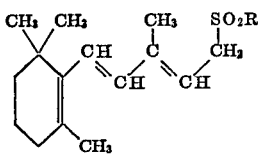

in which R is an aryl radical which comprises reacting vinyl-β-ionol either with an alkali metal sulphinate of formula $RSO_2M$, where M is an alkali metal and R is as hereinbefore defined, or first with a phorphosus trihalide and then with a said alkali metal sulphinate.

6. Process for the preparation of a sulphone of the formula:

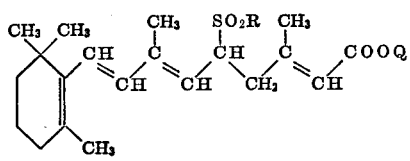

in which R is an aryl radical and Q is a hydrogen or an alkyl, cycloalkyl, aryl, or aralkyl radical, which comprises reacting a sulphone of the formula:

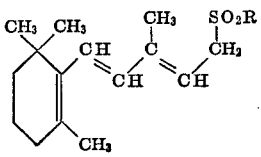

in which R is as hereinbefore defined, with a γ-halogeno-senecioate of formula:

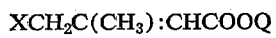

$$XCH_2C(CH_3):CHCOOQ$$

in which X is chlorine, bromine or iodine and Q is as hereinbefore defined, in the presence of a basic reagent having sufficient reactivity to convert the methylene group carrying the —$SO_2R$ radical of the said sulphone into an anion.

7. Process for the preparation of vitamin A acid or an ester thereof which comprises reacting a sulphone of the formula:

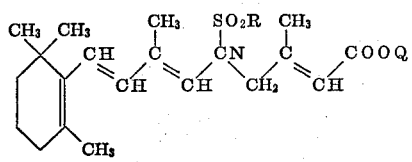

in which Q is hydrogen or an alkyl, cycloalkyl, aryl, or aralkyl radical, with an alkali metal hydroxide.

8. Process according to claim 6 in which the said basic reagent is an alkali metal alkoxide, alkali metal hydride, alkali metal amide, or an organo-lithium, organo-zinc, or organo-magnesium compound.

No references cited.

ELBERT L. ROBERTS, Primary Examiner

U.S. Cl. X.R.

260—607

UNITED STATES PATENT OFFICE
CERTIFICATE OF CORRECTION

Patent No. 3,781,313   Dated December 25, 1973

Inventor(s) Marc JULIA

It is certified that error appears in the above-identified patent and that said Letters Patent are hereby corrected as shown below:

In the heading immediately above the claim for Convention priority, read:

-- No Drawing. Filed January 18, 1972, Ser. No. 218,838 --

Signed and sealed this 5th day of November 1974.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,781,313
DATED : December 25, 1973
INVENTOR(S) : Marc JULIA

It is certified that error appears in the above—identified patent and that said Letters Patent are hereby corrected as shown below:

Claim 5, column 7, line 13, for "phorphosus" read --phosphorus--;

Claim 7, column 8, line 15, in the side chain of the structural formula, for the group "CN" read --CH--;

Claim 7, column 8, line 21, after "which" insert --R is an aryl radical and--.

Signed and Sealed this

Twenty-third Day of October 1979

[SEAL]

Attest:

RUTH C. MASON
Attesting Officer

LUTRELLE F. PARKER
Acting Commissioner of Patents and Trademarks